United States Patent [19]

Toki et al.

[11] Patent Number: 4,681,615
[45] Date of Patent: Jul. 21, 1987

[54] SILICA GLASS FORMATION PROCESS

[75] Inventors: Motoyuki Toki; Sadao Kanbe; Satoru Miyashita; Tetsuhiko Takeuchi, all of Suwa, Japan

[73] Assignee: Seiko Epson Kabushiki Kaisha, Tokyo, Japan

[21] Appl. No.: 642,606

[22] PCT Filed: Dec. 22, 1983

[86] PCT No.: PCT/JP83/00450
§ 371 Date: Aug. 20, 1984
§ 102(e) Date: Aug. 20, 1984

[87] PCT Pub. No.: WO84/02519
PCT Pub. Date: Jul. 5, 1984

[30] Foreign Application Priority Data

Dec. 23, 1982 [JP] Japan .................. 57-228198
Sep. 16, 1983 [JP] Japan .................. 58-170643
Sep. 16, 1983 [JP] Japan .................. 58-170644
Dec. 16, 1983 [JP] Japan .................. 58-237577

[51] Int. Cl.$^4$ ............................ C03B 19/06
[52] U.S. Cl. ........................ 65/18.1; 65/17; 501/12
[58] Field of Search ............ 65/17, 18.1, 18.3; 264/56; 501/12

[56] References Cited

U.S. PATENT DOCUMENTS

| 4,159,206 | 6/1979 | Armbruster et al. ........... 428/447 X |
| 4,317,668 | 3/1982 | Susa et al. ................... 501/12 X |
| 4,324,576 | 4/1982 | Matsuyama et al. ............ 501/12 X |
| 4,419,115 | 12/1983 | Johnson, Jr. et al. ......... 65/18.1 X |
| 4,472,510 | 9/1984 | January ...................... 65/17 X |

FOREIGN PATENT DOCUMENTS

| 29590 | 6/1981 | European Pat. Off. . |
| 57-22129 | 2/1981 | Japan . |
| 57-22130 | 2/1981 | Japan . |
| 58-26048 | 2/1983 | Japan . |
| 2075003 | 11/1981 | United Kingdom . |
| 2103202 | 2/1983 | United Kingdom . |

Primary Examiner—Kenneth M. Schor
Attorney, Agent, or Firm—Blum Kaplan

[57] ABSTRACT

A process for forming monolithic silica glass articles is provided. The process includes the steps of hydrolyzing silicon alkoxide to form a hydrolyzed solution, adding fumed silica to the hydrolyzed silicon alkoxide solution to yield a sol solution, gelling the sol solution to a gel, and drying and sintering the gel to obtain the monolithic silica glass articles.

21 Claims, 1 Drawing Figure

SILICA GLASS FORMATION PROCESS

TECHNICAL FIELD

This invention is related to a silica glass formation process, and more particularly to a silica glass formation process at a low temperature by the sol-gel technology using a metal alkoxide as raw material.

BACKGROUND ART

Silica glass has been recognized to be very advantageous to many uses, such as crucibles, boards and quartz tubes of furnaces in the manufacturing process of semiconductor, since it has been possible to prepare a silica glass of high purity. Besides, silica glass is used for a glass equipment such as a beaker for chemistry and a cell for optical measurement. Further, the development of the silica glass having less hydroxyl group or having good optical uniformity permits the various optical uses of silica glass. Especially, attention is given to silica glass fiber for optical communication. Furthermore, silica glass is used for a substrate of a Thin Film Transistor. In this way, silica glass is widely applied in various fields and the demand thereof is expected to increase still more in future.

At present, silica glass is mainly obtained by the following three approaches.
Method (1) wherein;
  Cleanly refined pure quartz is washed and melted.
Method (2) wherein;
  $SiO_2$ is formed from raw material $SiCl_4$ or $SiH_4$ of high purity.
Method (3) wherein;
  a pure silica sand is melted.

Whichever method is used, however, prepared silica glass amounts to expensive due to the high temperature treatment which is inevitably included in the manufacturing process and the difficulty in manufacturing glasses its own.

Accordingly, more economical process is eagerly desired for preparing silica glass. In order to prepare silica glass cheaply, two approaches are practiced; one is a sol-gel technology wherein a metal alkoxide is used as raw material, the other is a sol-gel technology wherein fumed silica is used as raw material. Each approach is described hereinafter.

The sol-gel process for economically preparing silica glass from metal alkoxides is studied by Nogami and Moriya, in Journal of Non-Crystalline Solids, 37, (1980) pp. 191–201.

The steps of this process are as follows; Silicon alkoxide, water, alcohol and proper catalyst such as hydrochloric acid or ammonia are mixed together and hydrolyzed. After gelling the hydrolyzed solution, the gel is dried to form dry gel. Dry gel is sintered by increasing temperature and collapsed completely to form silica glass. According to this sol-gel process, silica glass allowed to be highly pure for an alkoxide used as raw material is easily purified. In addition, manufacturing cost is less expensive than the conventional process for heat treatment is carried out at low temperature.

On the contrary, this process suffers the deficiency that large articles of dry gel tend to crack during drying and similarly during heating in a process of conversion from dry gel to silica glass. Under the condition, the obtained silica glass is not sufficiently large to put into practical use. So far as known from references, a disc type silica glass of 28 mm$\phi$ obtained by the study of Nogami and Moriya seems to be the largest at present.

On the other hand, the sol-gel process in which fumed silica is used as raw material is disclosed in Journal of Non-crystalline solids, 47, (1982) pp. 435–439 by E. M. Ravinovich et al. Fumed silica (trademark: Cab-o-sil supplied by Cabot Corp.) is mixed with water to be a hydrosol. After the hydrosol is gelled, the gel is dried to form dry gel, which is converted to silica glass by sintering. Being different from said metal alkoxide process, this sol-gel process using fumed silica has an advantage that the dry gel is hard to be broken or cracked during drying and sintering, which permits the formation of fairly large silica glass. Nevertheless, a realized silica glass in the aforesaid reference is at most as large as $95 \times 15 \times 5$ mm (including a 4% $B_2O_3$), which appears to be maximum in size. Moreover, this sol-gel method is disadvantageous in that the bubbles are so easily generated that there is a lot of cells in a realized silica glass. Therefore, this sol-gel process is unsuitable for an application requiring an optical uniformity.

As mentioned above, the conventional sol-gel process has not been enough sufficient to be applied in various field, since prepared silica glass thereby is not so large nor so good in quality.

DISCLOSURE OF INVENTION

The object of this invention is to provide an improved process for forming a silica glass plate of large size or a silica glass mass or large volume at low cost as compared to the conventional, with using a new sol-gel technology.

Another object of this invention is to provide an improved process for forming a silica glass of high quality.

A further object of this invention is to provide an improved process for forming a silica glass in good yield.

In the invention, a metal alkoxide is hydrolyzed to be sol solution. A fumed silica is added in the sol solution with stirring. After the stirred solution is gelled, the gel is dried to be dry gel. A silica glass is formed by heating the dry gel until it becomes non-porous. A summary of the invention is described hereinafter.

Water and hydrochloric acid, and proper solvent if need be, are added into the silicon alkoxide and hydrolyzed to be sol. A fumed silica (white carbon such as trademark: Aerosil supplied by Deutsche Gold and Silber Scheideanstalt Vormals Roessler Co., trademark: Cab-o-Sil supplied by Cabot Co., trademark: D.C. Silica supplied by Dow Corning Co., trademark: Arc Silica supplied by PPG Industries Inc., and so on) are added to the sol with well stirring. The sol is casted into the container of hydrophobic material such as polypropylene, polyvinylchloride, polyethylenefluorid (trademark: Teflon) and glass. The casted sol is gelled and dried to be dry gel. Dry gel is slowly heated from room temperature to a predetermined temperature where dry gel is kept until the pores therein are completely collapsed, in resulting to form a silica glass. Nogami et al's research tells that the way for preventing the dry gel from cracking during sintering in the sol-gel technology using a metal alkoxide as raw material is to form a porous dry gel including a great quantity of large pores of about 50 to 100 Å in diameter. This is also supposed by that E. M. Ravinovich et al's dry gel obtained by sol-gel technology using a fumed silica as raw material is hard to crack during sintering, and that the dry gel synthesized by hydrolyzing a metal alkoxide with ammonia (which is rather porous than the dry gel materialized by hydrolyzing a metal alkoxide with acid) is hard to crack during sintering. Further, the research of the inventors proves that the hardness of uncrackable dry gel against an intensive shrinkage during drying is determined by the pH value of the sol solution. Namely, the sol solution in which a metal alkoxide is hydrolyzed using an acid as catalyst indicates 1–2 pH value. As the pH value of the sol is higher, the synthesized dry gel is hard to crack, in resulting to be large dry gel.

In the light of the above, this invention has a feature that a fumed silica is added into a sol solution including a hydrolyzed metal alkoxide. The advantages brought by addition of a fumed silica is that a dry gel becomes so porous as to hardly crack during sintering, and that the pH value of the sol increases to about 2–3 so that the gelling speed is increased and the gel becomes hardly crackable during drying. Thus, this invention allows appearance of a large silica glass which has not been obtained by the conventional sol-gel method. In addition, the silica glass obtained by the forming process according to this invention has an optically good quality and is non-porous after sintering.

In this invention it is possible to use a fumed silica obtained by wet procss using sodium silicate as a raw material other than a white carbon obtained by hydrolyzing $SiCl_4$ with an oxyhydrogen flame burner, such as Aerosil and cab-O-Sil, since a fumed silica has only to be effective in making the dry gel porous. It is well known that silica fine particles are produced by hydrolyzing metal alkoxide with ammonia. A fumed silica similar to the white carbon is produced by salvage of silica fine particles. Adding of this salvaged fumed silica into a sol has the same effect as adding of the white carbon.

Next, it will be described about the conditions of improving the yield of dry gel basing on the research of inventors. The container of hydrophobic material, where the gel is cast, is good for drying gel. This is because the dry gel shrinks to 70% of the original in length during drying, so that the gel must be easily slide in the container with weak affinity therebetween. Organic polymer such as polypropylene, polyvinylchloride, polyethylenefluoride, polyethylene and polystyrene is suitable for a material of the container. The container of inorganic material whereon the organic material is coated has the same effect as the container of organic material.

With reference to drying condition, the evaporating speed of solvent in the gel such as water and alcohol is effective. The optimum drying condition must be set up in due consideration of the ratio of the area of the penetration holes in the lid of the container wherein the gel is cast to the total area of the lid (hereinafter referred to as the aperture rate), the drying temperature and the humidity.

Reduction in evaporating speed of the solvent in the gel with small evaporating rate contributes to make the gel uncrackable. However, as it takes many days to manufacture the dry gel, the manufacturing cost amounts to expensive. Consequently, it is desired to make yield good in short manufacturing time. Drying temperature influences the toughness of the gel. The higher the temperature is, the much tough gel is. As a result, good yield not obtained. However, the temperature beyond boiling point of the solvent is so high that the evaporating speed can not be controlled. The maximum of the temperature is about 120° C. Thus, it has been found in the experiment that the gel should be cast in the container with a lid of aperture rate less than 50%, preferably less than or equal to 10%, and dried at less than 120° C.

Furthermore, the sol cast in the container should be gelled at as low a temperature as possible for the purpose of preventing generation of bubbles therein. Normally, bubbles are apt to generate in the sol or in the surface where the sol and the container are connected. However, the lower the gelation temperature is, the less the bubbles generate. When the temperature at this time (hereinafter referred to as gelling temperature) is beyond 60° C., the bubbles generate in the completed sol. After sintering, these bubbles remain in the silica glass and optical quality is deteriorated. On the other hand, when the gelling temperature is too low, gelling speed drops and the manufacturing cost are expensive. The minimum temperature is 5° C. to keep the practical gelling speed. The practical gelling temperature should be between 5° C. and 60° C. After gelation is completed, a heating rate from gelling temperature to drying temperature should be low in order to obtain good yield, while it should be high in order to decrease the manufacturing time. The maximum temperature of heating rate is practically 120° C./h. A maximum dry gel of 12 cm$\phi$ is obtained under the above mentioned conditions.

It is aforementioned that the pH value of the sol is increased from 1–2 to 2–3 by adding a fumed silica, with the result that a tough gel can be obtained that does not crack as a result of the contraction of the gel in the drying step. Therefore, a large dry gel is obtained by increasing the pH value with addition of a base such as ammonia. As a result of the experiments, it is proved that the most tough and most uncrackable gel is obtained with pH value of 3–6. Thus, in a forming process of silica glass according to this invention, a further large silica glass can be obtained with adjustment of pH value of the sol. The following materials are suitable for bases of adjusting pH value; ammonia, ammonia gas, a solution of ammonia or an organic base, especially triethylamine, a solution of triethylamine, pyridine or a solution of pyridine, aniline, or a solution of aniline. On the contrary, an inorganic base including metal alkaline ion such as sodium hydride and potassium hydride is unsuitable for forming a silica glass since cation remains in the silica glass causing the composition of the silica glass to be changed. The inorganic base is suitable for multicomponent glasses such as a soda glass.

Next, conditions for sintering to obtain a silica glass of high quality in a good yield will be described. Sintering comprises the following three processes;

(1) process of removing the absorbed water
(2) process of removing carbon
(3) process of marking gel non-porous Process (1) has influence on the yield at sintering. Dry gel involves a large amount of physically absorbed water to be removed at 400° C. At the heat treatment, abrupt rise of temperature for taking the absorbed water makes dry gel easily crackable, resulting in poor yield. Therefore, the heating rate should be low in order to make the yield good. While, the heating rate should be high in considering the manufacturing cost. The maximum of the heating rate is 400° C./h so far as the yield is reasonable. Further, heat treatment should include at least one process of maintaining the gel for 1 hour or more at a predetermined temperature between 20° C. (a room temperature) and 400° C.

Process (2) is carried out at 400° C.–1100° C. The heating rate during this heat treatment has an influence on the yield, even though not so much as process (1). The experiments by the inventors proves that appropriate heating rate is between 30° C./h and 400° C./h. Further, heat treatment should desirably include one process of maintaining the gel for 3 hours or more at a predetermined temperature between 400° C. and 1100° C. At the time when the pH value is adjusted, basic-acid reaction matters remain in a dry gel. To be effective, this basic-acid reaction matters are decomposed during the process of removing carbon. It is desirable to lengthen the maintenance time in this case.

Process (3) is carried out at 1000° C. to 1400° C., which is slightly dependent on the adding amount of fumed silica. The most suitable heating rate from process (2) to process (3) is between 30° C./h and 400° C./h. A transparent silica glass having the same near infrared spectrum, Vickers hardness, a bulk density and the like as those of the silica glass on the market are formed by maintaining a dry gel for a predetermined time at a temperature where pores are collapsed. In this case, a dry gel is maintained for a long time at the temperature exceeding the above after pores are completely collapsed, bubbles are apt to generate. Generation of bubbles is due to the water remaining in a silica glass after collapsing pores. The less water a silica glass includes, the less bubbles generate. Water content in a silica glass is a function of the amount of fumed silica. With increasing adding amount of fumed silica, the involved water is so decreased that bubbles hardly generate. Therefore, a large amount of adding fumed silica is favorable for preventing generation of bubbles. On the contrary, the yield of dry gel at drying is poor when a large amount of fumed silica is added. In order to hardly generate bubbles with good yield, a fumed silica should be added so that the metal alkoxide and fumed silica may be in the ratio mol of 1:0.2–5.

On the other hand, there is a case where crystal such as cristobalite and tridymite is generated in a silica glass after sintering. This is a sort of devitrification. It has been found that a non-homogeneous dispersion of fumed silica in sol and/or a very small amount of impurities cause devitrification. To use the ultrasonic wave vibration and the centrifugal separation is effective for improving dispersion. Especially, small amount of impurities are removed by the centrifugal separation, thereby preventing occurrence of devitrification.

As described above, this invention can provide the large silica glass of about 15 × 15 cm which have been unprecedented by the conventional sol-gel method. Further, this invention can provide a silica glass in more than 90% yield with much lower cost than the conventional.

Furthermore, a multicomponent glass such as borosilicate glass, soda glass, silica/alumina glass, alkali-proof glass of $SiO_2$-$ZrO_2$ group, and low-expansion coefficient glass of $SiO_2$-$TiO_2$ group are allowed to be manufactured with low cost by applying this invention.

This invention is advantageous as the demand of the silica glass in the field wherein the silica glass is applied continues to expand. Furthermore, it is also of great advantage for expansion of new demand in the field wherein the silica glass has not been allowed to be applied due to the high cost.

BEST MODE OF CARRYING OUT THE INVENTION

Example 1

Figure 1:
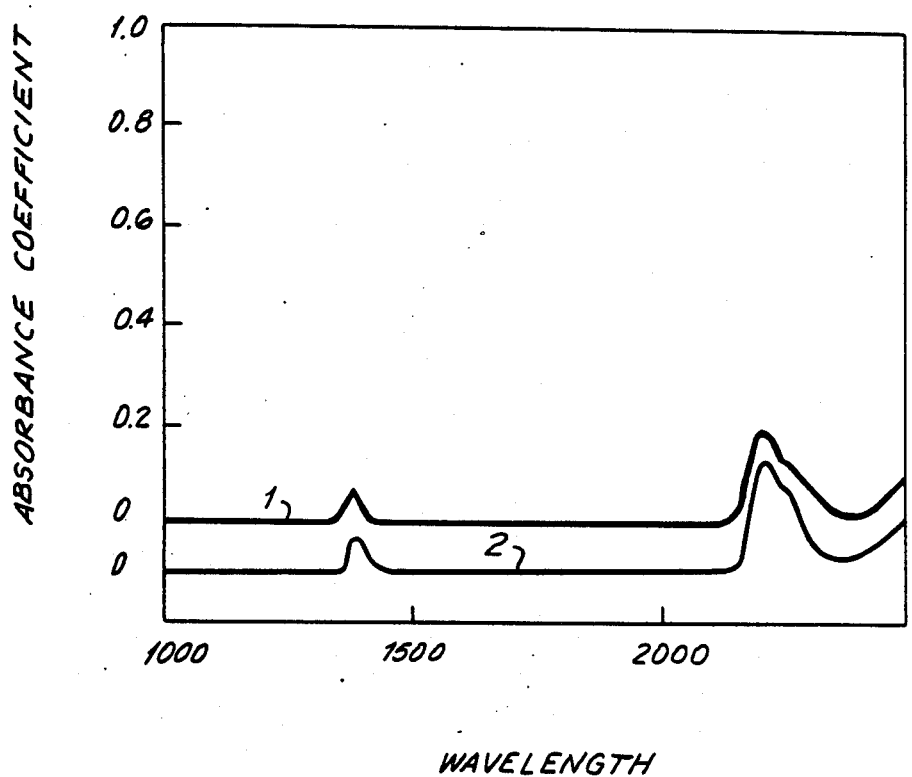
FIG. 1 illustrates the near infrared spectra of the silica glass obtained by the process in accordance with this invention and the silica glass obtained by the melting process on the market.

280 ml of 0.01 mol/l hydrochloric acid was added to 208 g (1 mol) of purified commercially available ethyl-silicate with violently stirring and the material was hydrolyzed. 72 g (1.2 mol) of fumed silica (trademark: Cab-o-sil, whose surface area is $200^2$ m/g supplied by Cabot Corp.) was added to the solution with stirring. The pH of the resultant sol was adjusted to 4.5 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 2% and the casting was heated from 20° C. to 60° C. at a heating rate of 2° C./h. The gel was dried at 60° C. for 7 days to yield a hard dry gel as large as 19 cm × 19 cm × 0.6 cm which was uncrackable at room temperature (20° C.). In the experiment, the sol prepared as described above was cast into 20 similar container and dried in the same condition. Then 2 out of 20 gels cracked and 18 were perfect, showing that the yield was 90%.

Thus prepared 18 dry gels were heated from room temperature to 200° C. at a heating rate of 60° C./h and maintained at 200° C. for 1 hour to remove the absorbed water. The samples then were heated to 950° C. at a heating rate of 180° C./h and maintained at 950° C. for 18 hours to remove carbon and ammonium chloride. After further heating to 1200° C. at a heating rate of 180° C./h and maintaining at 1200° C. for 1.5 hours, the samples became non-porous and the transparent silica glasses as large as 15cm × 15 cm × 0.5 cm were obtained. The sintering process as above did not cause cracking of any one of 18 samples in the 100%.

The near infrared spectra of the silica glass prepared in accordance with the above process (indicated by 1) and the silica glass on the market (by Sinetsu Sekiei Co., Ltd.) prepared by the melting process (indicated by 2) are shown in FIG. 1. As obvious in FIG. 1, they have almost the same near infrared spectrum of the silica glass. Besides the near infrared spectrum, the silica glass of this example has the same properties as the silica glass on the market, such as bulk density of 2.2, Vickers hardness of 792 and thermal expansion coefficint of $5.4 \times 10^{-7}$. Therefore, the silica glass of this example is regarded to be the same material as the fused silica glass.

Example 2

280 ml of 0.01 mol/l hydrochloric acid was added to 208 g (1 mol) of purified commercially available ethyl-silicate with violently stirring and the material was hydrolyzed. 25.8 g (0.43 mol) of fumed silica (trademark: Nipsil E220A which is obtained by wet process with sodium silicate as raw material supplied by Japan Sekiei Industry Corp., diameter of particle is 1.5 μm.)

was added to the solution with stirring and ultrasonic vibration was applied. The pH of the resultant sol was adjusted to 4.5 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 0.8% and the casting was heated from 20° C. to 70° C. at a heating rate of 2° C./h. The gel was dried at 70° C. for 12 days to yield a hard dry gel as large as 18 cm×18 cm×0.6 cm which was uncrackable at room temperature. In the experiment, the sol prepared as described above was cast into 20 similar containers and dried in the same condition. Then 3 out of 20 gels cracked and 17 were perfect, showing that the yield was 85%.

Thus prepared 17 dry gels were heated from room temperature to 300° C. at a heating rate of 60° C./h and maintained at 300° C. for 2 hours to remove the absorbed water. The samples then were heated to 950° C. at a heating rate of 180° C./h and maintained at 950° C. for 18 hours to remove carbon and ammonium chloride. After further heating to 1120° C. at a heating rate of 180° C./h and maintaining at 1120° C. for 1.5 hours, the samples became non-porous and the transparent silica glasses as large as 15 cm×15 cm×0.5 cm were obtained. In the sintering process as above, 2 out of 17 samples cracked in 88.2% yield.

The near infrared spectrum of the silica glass prepared in according with the above process presented almost the same shape as that of the silica glass now on the market. Besides the near infrared spectrum, the silica glass of this example has the same properties as the silica glass on the market, such as bulk density of 2.18, Vickers hardness of 790 and thermal expansion coefficient of $5.4 \times 10^{-7}$.

Example 3

280 ml of 0.01 mol/l hydrochloric acid was added to 208 g (1 mol) of purified commercially available ethylsilicate with violently stirring and the material was hydrolyzed. Mixture of 14 ml of 28% ammonia, 10 l of ethanol and 200 ml of water was added to the solution of 800 ml of ethylsilicate and 34.1 of ethanol and stirred at room temperature. The stirred mixture was left overnight and then a powder of silica is salvaged under reduced pressure. Then, the powder silica is left to stand 200° C. under air of nitrogen all the night. 60 g (1 mol) of powder of silica obtained in this way was added into the hydrolyzed solution with stirring and ultrasonic vibration was applied to obtain a sol of better uniformity. The pH of the resultant sol was adjusted to 4.5 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 1% and the casting was heated from 20° C. to 60° C. at a heating rate of 2° C./h. The gel was dried at 60° C. for 7 days to yield a hard dry gel as large as 21 cm×21 cm×0.7 cm which was uncrackable at room temperature. In the experiment, the sol prepared as described above was cast into 20 similar containers and dried in the same condition. Then 3 out of 20 gels cracked and 17 were perfect, showing that the yield was 85%.

Thus prepared 17 dry gels were heated by sintering from room temperature to 200° C. at a heating rate of 60° C./h and maintained at 200° C. for 3 hours and further heated to 300° C. at a heating rate of 60° C./h and maintained at 300° C. for 5 hours to remove the absorbed water. The samples then were heated to 950° C. at a heating rate of 180° C./h and maintained at 950° C. for 18 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above caused cracking of 5 of 17 samples and 12 perfect gels were obtained in a 70.6% yield. Moreover, all of the obtained silica glasses were free of either devitrification or bubbles and proved to be of high-quality. The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.21, Vickers hardness of 811 and thermal expansion coefficient of $5.6 \times 10^{-7}$.

Example 4

280 ml of 0.01 mol/l hydrochloric acid was added to 152 g (1 mol) of purified commercially available methylsilicate with violently stirring and the material was hydrolyzed. 90 g (1.5 mol) of fumed silica (trademark: Aerosil 0X50, whose surface area is 50 m²/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.5 by dripping 0.1 mol/l ammonia thereto. The sol was cast as thick as 1 cm into a cubical container of polypropylene having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 0.8% and the casting was heated from 20° C. to 70° C. at a heating rate of 5° C./h. The gel was dried at 70° C. for 7 days to yield a hard dry gel as large as 20 cm×20 cm×0.7 cm which was uncrackable at room temperature. In the experiment, the sol prepared as described above was cast into 20 similar containers and dried in the same condition. Then none of 20 gels cracked, showing that the yield was 100%.

Thus prepared 20 dry gels were heated from room temperature to 200° C. at a heating rate of 60° C./h and maintained at 200° C. for 3 hours. The samples then were heated to 300° C. at a heating rate of 60° C./h and maintained at 300° C. for 5 hours to remove the absorbed water. These gels were further heated to 950° C. at a heating rate of 180° C./h and maintained at 950° C. for 18 hours to remove carbon and ammonium chloride. After further heating to 1230° C. at a heating rate of 180° C./h and maintaining at 1230° C. for 1 hour, the samples became non-porous and the transparent silica glasses as large as 15 cm×15 cm×0.5 cm were obtained. The sintering process as above did not cause cracking of any one of 20 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.19, Vickers hardness of 771 and thermal expansion coefficient of $5.8 \times 10^{-7}$.

Example 5

280 ml of 0.01 mol/l hydrochloric acid was added to 208 g (1 mol) of purified commercially available ethylsilicate with violently stirring and the material was hydrolyzed. 73 g (1.22 mol) of fumed silica (Aerosil 0X50, whose surface area is 50 m$^2$/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.5 by dripping 0.1 mol/l ethanol solution of triethylamine thereto. The sol was cast as thick as 1 cm into a cubical container of polypropylene having the width of 30 cm, the length of 30 cm and the height of 10 cm and the container was sealed. The casting was permitted to stand at the temperature of 40° C. and gelled in 10 minutes. Further the gelled casting was maintained overnight.

Then the cover of the container was replaced by a lid with aperture rate 1% and the casting was heated from 40° C. to 70° C. at a heating rate of 5° C./h. The gel was dried at 70° C. for 7 days to yield a hard dry gel as large as 18.5 cm×18.5 cm×0.65 cm which was uncrackable at room temperature. In the experiment, the sol prepared as described above was cast into 20 similar containers and dried in the same way. Then 2 out of 20 gels cracked and 18 were perfect, showing that the yield was 90%.

Thus prepared 18 dry gels were heated from room temperature to 200° C. at a heating rate of 60° C./h and maintained at 200° C. for 3 hours, and further heated to 300° C. at a heating rate of 60° C./h and maintained at 300° C. for 5 hours to remove the absorbed water. The samples then were heated to 900° C. at a heating rate of 180° C./h and maintained at 900° C. for 9 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above did not cause cracking of any one of 18 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 790 and thermal expansion coefficient of $5.6 \times 10^{-7}$.

Example 6

280 ml of 0.01 mol/l hydrochloric acid was added to 208 g (1 mol) of purified commercially available ethylsilicate with violently stirring and the material was hydrolyzed. 73 g (1.22 mol) of fumed silica (trademark: Aerosil 0X50, whose surface area is 50$^2$m/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.5 by dripping 0.1 mol/l ethanol solution of pyridine thereto. The sol was cast as thick as 1 cm into a cubical container of polypropylene having the width of 30 cm, the length of 30 cm and the height of 10 cm and the container was sealed. The casting was permitted to stand at the temperature of 5° C. Then the cover of the container was replaced by a lid with aperture rate 1% of the total area of the lid and the casting was heated from 5° C. to 60° C. at a heating rate of 5° C./h. The gel was dried at 60° C. for 7 days to yield a hard dry gel as large as 18.8 cm×18.8 cm×0.65 cm which was uncrackable at room temperature. In the experiment, the sol prepared as described above was cast into 20 similar containers and dried in the same condition. Then 3 out of 20 gels cracked and 17 were perfect, showing that the yield was 85%.

Thus prepared 17 dry gels were heated from room temperature to 200° C. at a heating rate of 60° C./h and maintained at 200° C. for 3 hours. The dry gels were further heated from 200° C. to 300° C. at a heating rate of 60° C./h and maintained at 300° C. for 5 hours to remove the absorbed water. The samples then were heated to 900° C. at a heating rate of 180° C./h and maintained at 900° C. for 9 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above did not cause cracking of any one of 17 samples in a 100% yield.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 760 and thermal expansion coefficient of $5.6 \times 10^{-7}$.

Example 7

280 ml of 0.01 mol/l hydrochloric acid was added to 208 g (1 mol) of purified commercially available ethylsilicate with violently stirring and the material was hydrolyzed. 60 g (1 mol) of fumed silica (trademark: Cab-o-sil, whose surface area is 200$^2$ m/g supplied by Cabot Corp.) was added to the solution with stirring and ultrasonic vibration was applied. Massive matters were removed from the solution by centrifugal separation to obtain a sol of more perfect uniformity. The pH of the resultant sol was adjusted to 4.5 by making the diluent gas of ammonia gas with nitrogen gas bubble therein. The sol was cast as thick as 1 cm into a cubical container of polypropylene having the width of 30 cm, the length of 30 cm and the height of 10 cm and the container was sealed. The casting was permitted to stand at the temperature of 30° C. and gelled in 30 minutes. Then the cover of the container was replaced by a lid with aperture rate 5% and the casting was heated from 30° C. to 60° C. at a heating rate of 5° C./h. The gel was dried at 60° C. for 7 days to yield a hard dry gel as large as 21 cm×21 cm×0.7 cm which was uncrackable at room temperature. In the experiment, the sol prepared as described above was cast into 20 similar containers and dried in the same condition. Then 5 out of 20 gels cracked and 15 were perfect, showing that the yield was 75%.

Thus prepared 15 dry gels were heated from room temperature to 200° C. at a heating rate of 60° C./h and maintained at 200° C. for 3 hours. Dry gel was further heated to 300° C. at a heating rate of 60° C./h and maintained at 300° C. for 5 hours to remove the absorbed water. The samples then were heated to 950° C. at a heating rate of 180° C./h and maintained at 950° C. for 18 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above did not cause cracking of any one of 15 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.19, Vickers harness of 790 and thermal expansion coefficient of $5.4 \times 10^{-7}$.

Example 8

180 ml of 0.02 mol/l hydrochloric acid was added to 208 g (1 mol) of purified commercially available ethylsilicate with violently stirring and the material was hydrolyzed. 100 ml of water and 60 g (1 mol) of fumed silica (trademark: Aerosil 0X50, whose surface area is 50 m²/g supplied by Aerosil Corp.) was added to the solution with stirring and ultrasonic vibration was applied to obtain a sol of more perfect uniformity. The pH of this sol was 2.15. The sol was cast as thick as 1 cm into a cubical container of polypropylene having the width of 16 cm, the length of 16 cm and the height of 10 cm and the container was sealed. The casting was permitted to stand at the temperature of 20° C. and maintained overnight.

Then the cover of the container was replaced by a lid with aperture rate 0.1% and the casting was heated from 20° C. to 60° C. at a heating rate of 2° C./h. The gel was dried at 60° C. for 15 days to yield a hard dry gel as large as 11.5 cm×11.5 cm×0.7 cm which was uncrackable at room temperature. In the experiment, the sol prepared as described above was cast into 20 similar containers and dried in the same condition. Then 8 out of 20 gels cracked and 12 were perfect, showing that the yield was 60%.

Thus prepared 12 dry gels were heated by sintering from room temperature to 200° C. at a heating rate of 60° C./h and maintained at 200° C. for 3 hours. The gels were further heated to 300° C. at a heating rate of 60° C./h and maintained at 300° C. for 5 hours to remove the absorbed water. The samples then were heated to 950° C. at a heating rate of 180° C./h and maintained at 950° C. for 3 hours to remove carbon and ammonium chloride. After further heating to 1200° C. at a heating rate of 180° C./h and maintaining at 1200° C. for 1.5 hours, the samples became non-porous and the transparent silica glasses as large as 8 cm×8 cm×0.5 cm were obtained. The sintering process as above did not cause cracking of any one of 12 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides, the near infrared spectrum, the silica glass of this example has the same properties as the silica glass on the market, such as bulk density of 2.21, Vickers hardness of 790 and thermal expansion coefficient of $5.6 \times 10^7$.

Example 9

180 ml of 0.02 mol/l hydrochloric acid was added to 208 g (1 mol) of purified commercially available ethylsilicate with violently stirring and the material was hydrolyzed. 100 ml of water and 73 g (1.22 mol) of fumed silica (trademark: Aerosil 0X50, whose surface area is 50 m²/g supplied by Aerosil Corp.) were added to the solution with stirring and ultrasonic vibration was applied. Massive matters were removed from the solution by centrifugal separation to obtain a sol of more perfect uniformity. The pH of the resultant sol was adjusted to 4.5 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 1% and the casting was heated from 20° C. to 60° C. at a heating rate of 220 C./h. The gel was dried at 60° C. for 7 days to yield a hard dry gel as large as 20 cm×20 cm×0.7 cm which was uncrackable at room temperature. In the experiment, the sol prepared as described above was cast into 20 similar containers and dried in the same condition. Then 1 out of 20 gels cracked and 19 were perfect, showing that the yield was 95%.

Thus prepared 19 dry gels were heated from room temperature to 200° C. at a heating rate of 60° C./h and maintained at 200° C. for 3 hours. The dry gels is further heated to 300° C. at a heating rate of 60° C./h and maintained at 300° C. for 5 hours to remove the absorbed water. The samples then were heated to 950° C. at a heating rate of 180° C./h and maintained at 950° C. for 18 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above did not cause cracking of any one of 19 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 800 and thermal expansion coefficient of $5.5 \times 10^{-7}$.

EXAMPLE 10

280 ml of 0.01 mol/l hydrochloric acid was added to 208 g (1 mol) of purified commercially available ethylsilicate with violently stirring and the material was hydrolyzed. 300 g (5 mol) of fumed silica (Aerosil 0X50, whose surface area is 50 m$^2$/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.0 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 25° C. and gelled in 50 minutes. Further the gelled casting was maintained overnight.

Then the cover of the container was replaced by a lid with aperture rate 2% and the casting was heated from room temperature to 60° C. at a heating rate of 2° C./h. The gel was dried at 60° C. for 7 days to yield a hard dry gel as large as 21 cm × 21 cm × 0.7 cm which was uncrackable at room temperature. In the experiment, the sol prepared as described above was cast into 20 similar containers and dried in the same condition. Then 5 out of 20 gels cracked and 15 were perfect, showing that the yield was 75%.

Thus prepared 15 dry gels were heated from room temperature to 300° C. at a heating rate of 10° C./h and maintained at 300° C. for 5 hours to remove the absorbed water. The samples then were heated to 600° C. at a heating rate of 320° C./h and maintained at 600° C. for 9 hours to remove carbon and ammonium chloride. After further heating to 1400° C. at a heating rate of 320° C./h and maintaining at 1400° C. for 0.5 hours, the samples became non-porous and the transparent silica glasses as large as 15 cm × 15 cm × 0.5 cm were obtained. The sintering process as above did not cause cracking of any one of 15 samples in a 100% yield. Moreover, all of the obtained silica glasses were free from bubbles in spite of high temperature at 1400° C.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.18, Vickers hardness of 760 and thermal expansion coefficient of $5.8 \times 10^{-7}$.

EXAMPLE 11

180 ml of 0.02 mol/l hydrochloric acid was added to 208 g (1 mol) of purified commercially available ethylsilicate with violently stirring and the material was hydrolyzed. 100 ml of water and 12 g (0.2 mol) of fumed silica (trademark: Aerosil 0X50, whose surface area is 50 m$^2$/g supplied by Aerosil Corp.) were added to the solution with stirring and ultrasonic vibration was applied to yield a sol of better uniformity. The pH of the resultant sol was adjusted to 3.0 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 5° C. overnight.

Then the cover of the container was replaced by a lid with aperture rate 0.8% and the casting was heated from 5° C. to 60° C. at a heating rate of 2° C./h. The casting was dried at 60° C. for 10 days to yield a hard dry gel as large as 18.0 cm × 18.0 cm × 0.6 cm which was uncrackable at room temperature. In the experiment, the sol prepared as described above was cast into 20 similar containers and dried in the same condition. Then 10 out of 20 gels cracked and 10 were perfect, showing that the yield was 50%.

Thus prepared 10 dry gels were heated from room temperature to 200° C. at a heating rate of 10° C./h and maintained at 200° C. for 3 hours. Next, the samples were heated to 300° C. at a heating rate of 10° C./h and maintained at 300° C. for 5 hours to remove the absorbed water. The samples then were heated to 600° C. at a heating rate of 30° C./h and maintained at 600° C. for 18 hours to remove carbon and ammonium chloride. After further heating to 1000° C. at a heating rate of 30° C./h and maintaining at 1000° C. for 1.5 hours, the samples became non-porous and the transparent silica glasses as large as 14.0 cm × 14.0 cm × 0.45 cm were obtained. During the sintering process as above, 3 out of 10 samples cracked in 70% yield. Moreover, the obtained silica glasses were free from bubbles even if maintained for 30 minutes at 1200° C., while bubbles generated at 1300° C.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.19, Vickers hardness of 780 and thermal expansion coefficient of $5.6 \times 10^{-7}$.

Example 12

280 ml of 0.01 mol/l hydrochloric acid was added to 152 g (1 mol) of purified commercially available methylsilicate with violently stirring and the material was hydrolyzed. 90 g (1.5 mol) of fumed silica (trademark: Aerosil 0X50, whose surface area is 50 m$^2$/g supplied by Aerosil Corp.) were added to the solution with stirring and ultrasonic vibration was applied to yield a sol of better uniformity. The pH of the resultant sol was adjusted to 6.0 by dripping 0.1 normal ammonia solution thereto. The sol was cast as thick as 1 cm into a cubical container of polypropylene having the width of 30 cm, the length of 30 cm and the height of 10 cm and the container was sealed. The casting was permitted to stand at the temperature of 5° C. and gelled in 10 minutes. Further the gelled casting was maintained overnight.

Then the cover of the container was replaced by a lid with aperture rate 2% and the casting was heated from 5° C. to 65° C. at a heating rate of 5° C./h. The casting was dried at 65° C. for 7 days to yield a hard dry gel as large as 18.5 cm × 18.5 cm × 0.63 cm which was uncrackable at room temperature. In the experiment, the sol prepared as described above was cast into 20 similar containers and dried in the same condition. Then 20 dry gels were obtained, showing that the yield was 100%.

Thus prepared 20 dry gels were heated from room temperature to 200° C. at a heating rate of 60° C./h and maintained at 200° C. for 3 hours. Next, the samples were heated to 300° C. at a heating rate of 400° C./h and maintained at 300° C. for 5 hours to remove the absorbed water. The samples then were heated to 1000° C. at a heating rate of 400° C./h and maintained at 1000° C. for 8 hours to remove carbon and ammonium chloride. After further heating to 1150° C. at a heating rate of 400° C./h and maintaining at 1150° C. for 1.5 hours, the samples became non-porous and the transparent silica glasses as large as 14.5 cm×14.5 cm×0.5 cm were obtained. During the sintering process as above, 2 out of 20 samples cracked and 18 were perfect in a 90% yield. Moreover, all of the silica glasses were free from bubbles even if maintained for 30 minutes at 1200° C., while bubbles generated at 1300° C.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.19, Vickers hardness of 780 and thermal expansion coefficient of $5.4 \times 10^{-7}$.

Example 13

280 ml of 0.01 mol/l hydrochloric acid was added to 152 g (1 mol) of purified commercially available methylsilicate with violently stirring and the material was hydrolyzed. 75 g (1.25 mol) of fumed silica (trademark: Aerosil 0X50, whose surface area is $50^2$ m/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.5 by dripping 0.1 mol/l ammonia solution thereto. The sol was cast as thick as 1 cm into a cubical container of Teflon having the width of 30 cm, the length of 30 cm and the height of 10 cm and the container was sealed. The casting was permitted to stand at room temperature and gelled in 30 minutes. Further the gelled casting was maintained overnight.

Then the cover of the container was replaced by a lid with aperture rate 2% and the casting was heated from room temperature to 60° C. at a heating rate of 2° C./h. The gel was dried at 60° C. for 7 days to yield a hard dry gel as large as 21 cm×21 cm×0.7 cm which was uncrackable at room temperature. In the experiment, the sol prepared as described above was cast into 20 similar containers and dried in the same condition. Then 20 perfect dry gels were obtained, showing that the yield was 100%.

Thus prepared 20 dry gels were heated from room temperature to 300° C. at a heating rate of 180° C./h and maintained at 300° C. for 1 hour to remove the absorbed water. The samples then were heated to 950° C. at a heating rate of 320° C./h and maintained at 950° C. for 18 hours to remove carbon and ammonium chloride. After further heating to 1220° C. at a heating rate of 320° C./h and maintaining at 1220° C. for 1.5 hours, the samples became non-porous and the transparent silica glasses as large as 15 cm×15 cm×0.5 cm were obtained. During the sintering process as above, 1 out of the 20 samples cracked in 95% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 800 and thermal expansion coefficient $5.4 \times 10^{-7}$.

Example 14

280 ml of 0.01 mol/l hydrochloric acid was added to 208 g (1 mol) of purified commercially available ethylsilicate with violently stirring and the material was hydrolyzed. 120 g (2 mol) of fumed silica (trademark: Aerosil OX50, whose surface area is $50^2$ m/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.3 by dripping 0.1 mol/l ammonia solution thereto. The sol was cast as thick as 1 cm into a cubical container of glass whose surface was coated with polyvinyl chrolide having the width of 30 cm, the length of 30 cm and the height of 10 cm and the container was sealed. The casting was permitted to stand at the temperature of 20° C. and gelled in 30 minutes. Further the gelled casting was maintained overnight.

Then the cover of the container was replaced by a lid with aperture rate 2% and the casting was heated from 20° C. to 60° C. at a heating rate of 2° C./h. The gel was dried at 60° C. for 7 days to yield a hard dry gel as large as 21 cm×21 cm×0.7 cm which was uncrackable at room temperature. In the experiment, the sol prepared as described above was cast into 20 similar molds and dried in the same condition. Then 1 out of 20 gels cracked and 19 were perfect in 95% yield. Thus prepared 19 dry gels were heated by sintering from room temperatrue to 200° C. at a heating rate of 60° C./h and maintained at 200° C. for 1 hour to remove the absorbed water. The samples then were heated to 950° C. at a heating rate of 180° C./h and maintained at 950° C. for 9 hours to remove carbon and ammonium chloride. After further heating to 1280° C. at a heating rate of 180° C./h and maintaining at 1280° C. for 1.5 hours, the samples became non-porous and the transparent silica glasses as large as 15 cm×15 cm×0.5 cm were obtained. During the sintering process as above, 1 out of the 18 samples cracked in 94.7% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 805 and thermal expansion coefficient of $5.5 \times 10^{-7}$.

Example 15

280 ml of 0.01 mol/l hydrochloric acid was added to 208 g (1 mol) of purified commercially available ethylsilicate with violently stirring and the material was hydrolyzed. 73 g (1.22 mol) of fumed silica (trademark: Aerosill OX50, whose surface area is $50^2$ m/g supplied by Aerosil Corp.) was added to the solution with stirring and ultrasonic vibration was applied. Massive matters were removed from the solution by centrifugal separation to obtain a sol of better uniformity. The pH of the resultant sol was adjusted to 4.1 by dripping 0.1 mol/l ammonia solution thereto. The sol was cast as thick as 1 cm into a cubical container of glass whose surface was coated with polyvinyl chrolide having the width of 30 cm, the length of 30 cm and the height of 10 cm and the container was sealed. The casting was permitted to stand at the temperature of 60° C. and gelled in 10 minutes. Then the cover of the container was replaced by a lid with a hole whose area was 0.5% of the total area of the lid and the casting was heated from 60° C. to 120° C. at a heating rate of 2° C./h. The gel was dried at 120° C. for 4 days to yield a hard dry gel as large as 21 cm×21 cm×0.7 cm which was uncrackable at room temperature. In the experiment, the sol prepared as described above was cast into 20 similar containers and dried in the same condition. Then 6 out of 20 gels cracked and 14 were perfect in 70% yield.

Thus prepared 14 dry gels were heated from room temperature to 400° C. at a heating rate of 60° C./h and maintained at 400° C. to remove the absorbed water. The samples then were heated to 1100° C. at a heating rate of 180° C./h and maintained at 1100° C. for 3 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. During the sintering process as above, 3 out of the 14 samples cracked in 78.6% yield. The near infrared spectrum of the silica glass prepared in accordance with the above process presented almost the same shape as that of the silica glass now on the market. Besides the near infrared spectrum, the silica glass of this example has the same properties as the silica glass on the market, such as bulk density of 2.2, Vickers hardness of 800 and thermal expansion coefficient of $5.5 \times 10^{-7}$.

Example 16

280 ml of 0.05 mol/l hydrochloric acid was added to 208 g (1 mol) of purified commercially available ethylsilicate with violently stirring and the material was hydrolyzed. 73 g (1.22 mol) of fumed silica (trademark: Aerosil OX50, whose surface area is $50^2$ m/g supplied by Aerosil Corpo.) was added to the solution with stirring and ultrasonic vibration was applied. Massive matters were removed from the solution by centrifugal separation to obtain a sol of better uniformity. The pH of the resultant sol was adjusted to 5.0 by dripping 0.1 mol/l ammonia solution thereto. The sol was cast as thick as 1 cm into a cubical container of polypropylene having the width of 30 cm, the length of 30 cm and the height of 10 cm and the container was sealed. The casting was permitted to stand at the temperature of 5° C. overnight. Then the cover of the container was replaced by a lid with aperture rate 50% the casting was heated from 5° C. to 20° C. at a heating rate of 120° C./h. The gel was dried at 20° for 22 days to yield a hard dry gel as large as 21 cm×21 cm×0.7 cm which was uncrackable at room temperature. In the experiment, the sol prepared as described above was cast into 20 similar containers and dried in the same condition. Then 16 out of 20 gels cracked and 4 were perfect, showing that the yield was 20%.

Thus prepared 4 dry gels were heated from room temperatrue to 200° C. at a heating rate of 10° C./h and maintained at 200° C. for 2 hours. Next, the samples were heated to 300° C. at a heating rate of 10° C./h and maintained at 300° C. for 2 hours to remove the absorbed water. The samples then were heated to 950° C. at a heating rate of 180° C./h and maintained at 950° C. for 6 hours to remove carbon and ammonium chloride. After further heating to 1220° C. at a heating rate of 180° C./h and maintaining at 1220° C. for 1.5 hours, the samples became non-porous and the transparent silica glasses as large as 15 cm×15 cm×0.5 cm were obtained. The sintering process as above did not cause cracking of any one of 4 samples in a 100% yield. Moreover, all of the obtained silica glasses were free of either devitrification or bubbles and proved to be of high-quality.

The near infrared spectrum of the silica glass prepared in accordance with the above process presented almost the same shape as that of the silica glass now on the market. Beside the near infrared spectrum, the silica glass of this example has the same properties as the silica glass on the market, such as bulk density of 2.19, Vickers hardness of 810 and thermal expansion coefficient of $5.4 \times 10^{-7}$.

Example 17

180 ml of 0.1 mol/l hydrochloric acid and 20 ml of ethanol were added to 208 g (1 mol) of purified ethylsilicate on the market. The mixture was stirred for 30 minutes sufficiently to conclude the hydrolysis. The 40 g of fumed silica trademark: Cab-o-sil was added to the hydrolyzed mixture with stirring. After ultrasonic vibration is applied for homogenizing the solution for 30 minutes, the large lump of cab-o-sil or some foreign particles were filtered to be more homogenized. 0.1 mol/l ammonia solution was dropped in the homogenized sol to adjust the pH of solution to 4.4. The sol was cast as thick as 1 cm into the container of polypropylene (23 cmφ in inside diameter) and maintained. The casting was gelled in 30 minutes. Further the casting was maintained for 10 days at room temperature, in resulting that white dry gel of 15 cmφ was obtained with shrinkage of the gel. Subsequently the dry gel was heated to 1150° C. at a heating rate of 180° C./h, so that the dry gel becomes transparent. As a result, a silica glass of 10.2 cmφ was obtained.

The silica glass obtained in this example has bulk density of 2.2, Vickers hardness of 800 and almost the same near infrared spectrum as the silica glass on the market.

Example 18

Similarly to example 17, 180 ml of 0.1 mol/l hydrochloric acid and 20 ml of ethanol were added to 208 g (1 mol) of purified commercially available ethylsilicate with violently stirring and the material was hydrolyzed. 50 ml of water and 60 g of fumed silica trademark: Cab-o-sil were added to the solution with stirring and ultrasonic vibration was applied. Massive matters were removed from the solution by centrifugal separation to obtain a sol of better uniformity. The sol was gelled under the same condition as example 17. The dry gel was sintered at 1200° C. and then the silica glass of 10.3 cmφ was obtained.

The silica glass thus obtained has the same properties as the silica glass on the market similarly to example 17.

Example 19

Similarly to example 18, 180 ml of 0.1 mol/l hydrochloric acid and 20 ml of ethanol were added to 208 g (1 mol) of purified commercially available ethylsilicate with violently stirring and the material was hydrolyzed. 400 ml of water and 140 g of fumed silica Cab-o-sil were added to the solution with stirring and ultrasonic vibration was applied. Massive matters were removed from the solution by centrifugal separation to obtain a sol of better uniformity. The sol was gelled under the same condition as example 18 and dried. The dry gel was sintered, so that the silica glass of 10.3 cmφ was obtained.

The silica glass thus obtained has the same properties as the silica glass on the market.

Example 20

Similarly to example 18, 180 ml of 0.1 mol/l hydrochloric acid and 20 ml of ethanol were added to 208 g (1 mol) of purified commercially available ethylsilicate with violently stirring and the material was hydrolyzed. 800 ml of water and 240 g of fumed silica Cab-o-sil were added to the solution with stirring and ultrasonic vibration was applied. Massive matters were removed from the solution by centrifugal separation to obtain a sol of better uniformity. The sol was gelled under the same condition as example 18 and dried. The dry gel was sintered, so that the silica glass of 10.3 cmφ was obtained.

The silica glass thus obtained has the same properties as the silica glass on the market.

Example 21

1800 ml of 0.1 mol/l hydrochloric acid was added to 2080 g (10 mol) of purified ethylsilicate on the market. The mixture was stirred for 30 minutes sufficiently to conclude the hydrolysis, to which 1000 ml of water was added. Then 750 g of fumed silica trademark: Cab-o-sil was added to the hydrolyzed mixture with stirring. After ultrasonic vibration is applied for homogenizing the solution for 30 minutes, the large lump of Cab-o-sil or some foreign particles were filtered to be more homogenized. 0.1 mol/l ammonia solution was dropped in the homogenized sol to adjust the pH of solution to 4.4. The sol was cast as thick as 1 cm into the container of polypropylene (23 cmφ in inside diameter). Then the sol in the cast was put to a test to examine how long the time is required for forming a silica glass and how the yield is varied under the some conditions (the aperture rate of a lid of the container and the drying temperature) as indicated in Table 1.

Table 1 proves that there is the maximum of the aperture rate of the lid for getting 100% yield with proper drying temperature. Namely, the aperture rate must be less than 10% at the drying temperature of 30° C. Transparent silica glass is gained by sintering any of thus obtained dry gel.

TABLE 1

| first aperture rate (%) | maintenance days | second aperture rate (%) | yield (%) |
| --- | --- | --- | --- |
| 70 | 2 | 6 | 100 |
| 60 | 5 | 4 | 20 |
| 60 | 4 | 5 | 80 |
| 60 | 2 | 6 | 100 |
| 60 | 1 | 8 | 100 |
| 50 | 5 | 4 | 40 |
| 50 | 4 | 6 | 90 |
| 50 | 3 | 7 | 100 |
| 50 | 2 | 7 | 100 |
| 50 | 1 | 8 | 100 |
| 40 | 10 | 6 | 20 |
| 40 | 7 | 8 | 100 |
| 40 | 5 | 10 | 100 |
| 30 | 12 | 8 | 70 |

TABLE 1-continued

| first aperture rate (%) | maintenance days | second aperture rate (%) | yield (%) |
| --- | --- | --- | --- |
| 30 | 10 | 10 | 100 |

Example 22

The sol obtained by the same process as the example 21 was cast into the container having a lid of a predetermined aperture rate (first aperture rate) and maintained for a predetermined days at a room temperature to be schrinkaged. Then the casting with the same lid or with an alternated lid of the different aperture rate (second aperture rate) was heated to the predetermined temperature and maintained for the predetermined days to be dry gel. The yield at the time was examined under the conditions as shown in Table 2.

Table 2 teaches that the dry gel can be formed in a 100% yield by being once schrinkaged at properly low temperature and subsequently be heated to high temperature, even if the aperture rate was large. Simultaneously, the days need for forming the dry gel can be decreased.

TABLE 2

| first aperture rate (%) | maintenance days | second aperture rate (%) | drying temperaature (°C.) | drying days | yield (%) |
| --- | --- | --- | --- | --- | --- |
| 20 | 6 | 20 | 80 | 2 | 80 |
| 15 | 6 | 15 | 90 | 2 | 90 |
| 10 | 7 | 10 | 90 | 2 | 90 |
| 20 | 2 | 2 | 70 | 4 | 90 |
| 15 | 1 | 2 | 70 | 6 | 100 |
| 10 | 1 | 2 | 80 | 5 | 100 |
| 5 | 1 | 3 | 80 | 4 | 90 |
| 3 | 1 | 3 | 80 | 4 | 100 |

Example 23

The sol obtained by the same process as the example 21 was dried to make the white dry gel of 15.0 cmφ by the conventional method. As shown in Table 3, the dry gel was heated from room temperature to a first maintenance temperature at a heating rate 180° C./h and maintained for a first maintenance time at the first maintenance temperature. Subsequently, the gel was heated to a second maintenance temperature at a heating rate of 180° C./h and maintained for a second maintenance time at the second maintenance temperature. Similarly the gel was further heated to a third maintenance temperature and maintained for the third maintenance time. Then, the gel was similarly heated to 1150° C. and maintained for 3 hours, and the silica glass was prepared by sintering.

It is proved that the silica glass obtained in this example are free from bubbles even if heated for 30 minutes at 1300° C. In a case where the sum total of maintenance time is equal, the longer the maintenance time at high temperature is, the less bubbles generate.

TABLE 3

| first maintenance | | second maintenance | | third maintenance | |
| --- | --- | --- | --- | --- | --- |
| temperature (°C.) | time (h) | temperature (°C.) | time (h) | temperature (°C.) | time (h) |
| 950 | 18 | 1000 | 6 | 1050 | 3 |
| 950 | 18 | 1000 | 6 | 1050 | 6 |
| 950 | 9 | 1000 | 6 | 1050 | 3 |
| 950 | 6 | 1000 | 6 | 1050 | 6 |
| 950 | 6 | 1000 | 3 | 1050 | 3 |

TABLE 3-continued

| first maintenance | | second maintenance | | third maintenance | |
|---|---|---|---|---|---|
| temperature (°C.) | time (h) | temperature (°C.) | time (h) | temperature (°C.) | time (h) |
| 950 | 3 | 1000 | 2 | 1050 | 3 |
| 950 | 3 | 1000 | 2 | 1050 | 1 |
| 950 | 9 | 1050 | 3 | 1100 | 2 |
| 950 | 6 | 1050 | 3 | 1100 | 3 |
| 950 | 3 | 1050 | 4 | 1100 | 5 |

What is claimed is:

1. A process for forming a monolithic silica glass article, comprising;
   hydrolyzing a silicon alkoxide in solution to form a hydrolyzed solution;
   adding fumed silica to the hydrolyzed solution in an amount between about 0.2 to 5 mols of silica per mol of silicon alkoxide to form a sol solution;
   gelling the sol solution to form a gel;
   drying the gel to a dry gel; and
   sintering the dry gel at a temperature effective to form a glass in order to form a large monolithic silica glass article without cracking.

2. The process of claim 1, wherein the fumed silica is formed by hydrolyzing $SiCl_4$ with an oxy-hydrogen flame.

3. The process of claim 1, wherein said fumed silica is derived from a sodium silicate solution.

4. The process of claim 1, wherein said fumed silica is obtained by hydrolyzing a silicon alkoxide with ammonia.

5. The process of claim 1, further including the step of uniformly dispersing the fumed silica in the sol solution by ultrasonic vibration.

6. The process of claim 1, further including the step of dispersing the fumed silica in the sol solution by centrifugal separation to insure uniform dispersion of fumed silica.

7. The process of claim 1, wherein the silicon alkoxide is silicon ethoxide.

8. The process of claim 1, wherein the hydrolyzed silicon alkoxide is silicon ethoxide hydrolyzed with hydrochloric acid.

9. The process of claim 1, including the step of adjusting the pH of the sol solution to between about 3 and 6 by addition of a base.

10. The process of claim 1, wherein the pH of the sol solution is adjusted to between about 4 to 4.5 by addition of a base.

11. The process of claim 9, wherein the base is any one of ammonia and an organic base.

12. The process of claim 11, wherein the ammonia is selected from the group of ammonia water, ammonia gas and an ammonia solution.

13. The process of claim 11, wherein the organic base is selected from the group of triethylamine, an aqueous solution of triethylamine, pyridine, an aqueous solution of pyridine, aniline or an aqueous aniline solution.

14. The process of claim 1, further including the step of drying the sol solution to a gel, and drying the gel to a dry gel in a mold having a lid covering the mold, said lid formed with aperatures comprising less than 50% of the surface area of the lid.

15. The process of claim 9, wherein the sol solution is gelled in a mold having a lid covering the mold and formed with openings comprising less than about 20% of the surface area of the lid.

16. The process of claim 1, wherein the gel is formed at temperatures between about 5° to 60° C. and the gel is dried to a dry gel at a drying temperature between about 20° to 120° C.

17. The process of claim 16, wherein the gel is heated to the drying temperature at a rate less than about 120° C. per hour.

18. The process of claim 1, wherein the sintering of the dry gel includes the steps of (a) removing absorbed water; (b) removing carbon and (c) making the dry gel non-porous.

19. The process of claim 18, including at least one heating step of removing absorbed water by heating the dry gel to a first selected temperature between about 20° and 400° C. at a heating rate of less than 400° C. per hour and maintaining the dried gel at the selected temperature for at least about one hour.

20. The process of claim 19, further including at least one heating step of removing carbon by heating the dry gel to a second selected temperature between about 400° and 1200° C. at a heating rate of between about 30° to 400° C. per hour and maintaining the second selected temperature for a period of more than at least 3 hours.

21. The process of claim 20, further including at least one heating step of making the dry gel non-porous by heating the dry gel to a third selected temperature between about 1000° and 1400° C. at a heating rate of between about 30° and 400° C. per hour.

* * * * *